United States Patent
Choi et al.

(10) Patent No.: US 9,874,121 B2
(45) Date of Patent: Jan. 23, 2018

(54) VARIABLE VALVE LIFT APPARATUS

(71) Applicant: Hyundai Motor Company, Seoul (KR)

(72) Inventors: Myungsik Choi, Seoul (KR); Young Hong Kwak, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 126 days.

(21) Appl. No.: 14/955,249

(22) Filed: Dec. 1, 2015

(65) Prior Publication Data
US 2017/0016362 A1    Jan. 19, 2017

(30) Foreign Application Priority Data

Jul. 15, 2015  (KR) .................. 10-2015-0100557

(51) Int. Cl.
| | | |
|---|---|---|
| *F01L 1/34* | (2006.01) |
| *F01L 13/00* | (2006.01) |
| *F01L 1/18* | (2006.01) |
| *F16K 1/32* | (2006.01) |
| *F16K 31/524* | (2006.01) |
| *F01L 1/46* | (2006.01) |

(52) U.S. Cl.
CPC ........... *F01L 13/0021* (2013.01); *F01L 1/185* (2013.01); *F01L 13/0005* (2013.01); *F16K 1/32* (2013.01); *F16K 31/52408* (2013.01); *F01L 2001/186* (2013.01); *F01L 2001/467* (2013.01); *F01L 2105/00* (2013.01)

(58) Field of Classification Search
CPC ... F01L 13/0021; F01L 13/0005; F01L 1/185; F01L 2001/186; F01L 2001/467; F01L 2105/00; F16K 1/32; F16K 31/52408
See application file for complete search history.

(56) References Cited

U.S. PATENT DOCUMENTS

| | | | |
|---|---|---|---|
| 6,314,928 B1 | 11/2001 | Baraszu et al. | |
| 6,612,276 B2 * | 9/2003 | Cecur | F01L 1/185 |
| | | | 123/196 R |
| 2004/0074459 A1 | 4/2004 | Hayman et al. | |

FOREIGN PATENT DOCUMENTS

| | | |
|---|---|---|
| JP | 2008-184962 A | 8/2008 |
| JP | 2009-068382 A | 4/2009 |
| KR | 10-1234643 B1 | 2/2013 |

* cited by examiner

*Primary Examiner* — Zelalem Eshete
(74) *Attorney, Agent, or Firm* — Morgan Lewis & Bockius LLP

(57) ABSTRACT

A variable valve lift apparatus that changes a lift of a valve in an engine may include: an outer body; an inner body; a cam contact portion disposed in the second space, rotatably connected to the inner body, and contacting the cam so that the inner body makes a lever motion according to rotation of the cam; a connecting shaft disposed and the one end of the inner body and connect the outer body with the inner body; and a lost motion spring, wherein the inner body is selectively fixed to the outer body or is selectively released from fixing with the outer body, and both ends of the connecting shaft protrude to both sides in the width direction of the outer body and a valve contact portion, which contacts a valve, is formed at the both ends.

8 Claims, 7 Drawing Sheets

VARIABLE VALVE LIFT APPARATUS

CROSS-REFERENCE TO RELATED APPLICATION

The present application claims priority to and the benefit of Korean Patent Application No. 10-2015-0100557 filed on Jul. 15, 2015, the entire contents of which is incorporated herein for all purposes by this reference.

BACKGROUND OF THE INVENTION

Field of the Invention

The present invention relates to a variable valve lift apparatus. More particularly, the present invention relates to a three-point supported variable valve lift apparatus that is supported on two valves and one hydraulic lash adjuster.

Description of Related Art

In general, internal combustion engines generate power by receiving and burning air and fuel in a combustion chamber. When an intake valve is operated by a camshaft, air is drawn into the combustion chamber with the intake valve open. Further, when an exhaust valve is operated by the camshaft, air is discharged from the combustion chamber with the exhaust valve open.

The optimum operation of the intake valve or the exhaust valve depends on the RPM of the engine. That is, appropriate timing for lifting or opening/closing the valves is controlled on the basis of the RPM of the engine. In order to appropriately operate valves in accordance with the RPM of an engine, as described above, a VVL (Variable Valve Lift) apparatus that operates valves at different lifts in accordance with the RPM of an engine has been studied. As an example of the variable valve lift apparatus, there is an apparatus that includes a plurality of cams on a camshaft for operating valves at different lifts, and is operated such that the cams for operating the valves are selected in accordance with circumstances.

However, when a plurality of cams is provided on a camshaft, a configuration for switching the cams to operate an intake valve or an exhaust valve is complicated and there may be interference between components. On the other hand, when a plurality of cams is independently operated to prevent interference between components, components for operating the cams are additionally required, so the manufacturing cost may be increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a variable valve lift apparatus having advantages of being able to change valve lifts with one cam.

In addition, the present invention provides a variable valve lift apparatus further having advantages of reducing assembly tolerance as a valve contact portion is integrally formed with both ends of a connecting shaft for connecting an inner body to an outer body so as to remove a pallet.

An exemplary embodiment of the present invention provides a variable valve lift apparatus that changes a lift of a valve in an engine, including: an outer body selectively making a lever motion according to rotation of a cam and forming a first space; an inner body disposed in the first space, adapted such that one end thereof is rotatably connected with the one end of the outer body, and forming a second space; a cam contact portion disposed in the second space, rotatably connected to the inner body, and contacting the cam so that the inner body makes a lever motion according to rotation of the cam; a connecting shaft disposed so as to penetrate the one end of the outer body and the one end of the inner body and connect the outer body with the inner body; and a lost motion spring adapted such that one end thereof is fixed to the outer body and the other end thereof is fixed to the inner body.

The inner body may be selectively fixed to the outer body so as to make a lever motion together with the outer body around a rotation axis of the outer body lever motion or is selectively released from fixing with the outer body so as to make a lever motion around the connecting shaft, both ends of the connecting shaft protrude to both sides in the width direction of the outer body, and a valve contact portion which contacts a valve is formed at the both ends.

The outer body may be formed in a "U" shape as the first space is opened toward the one end of the outer body, and a pinhole is respectively formed at both ends of the opened one end such a fixing pin is inserted therein so as to prevent motion in an axial direction of the connecting shaft.

A fixing groove corresponding to the pinhole may be respectively formed at both sides opposite to the valve contact portion of the connecting shaft.

The fixing groove is formed at both ends in a length direction of the connecting shaft apart from each other, and a cross-section thereof may be respectively formed in a half-circle shape.

The valve contact portion may be formed by a horizontal surface at both sides of the connecting shaft.

An opening hole is respectively formed at both sides of the outer body in a width direction, and a rib corresponding to a shaft, which is rotatably supported by the cam contact portion, may be formed on the opening hole.

The rib is formed so as to connect an upper portion with a lower portion of the opening hole along the lever motion direction of the inner body, and may be adapted to form a guide groove at an interior surface thereof where the shaft is inserted.

The lost motion spring may be provided so as to return the inner body which is relatively rotated with the outer body around the connecting shaft.

The one end of the lost motion spring may be extended without interference with the inner body so as to be fixed to the one end of the outer body.

The outer body may integrally form a supporting end to correspond to the one end of the lost motion spring.

As described above, according to an exemplary embodiment of the present invention, two valve lifts are changed by the cam contact portion moving in contact with one cam, such that a loss of power due to friction on the cam can be minimized.

Further, since only the inner body makes a lever motion with the cam contact portion being in contact with the cam, a cylinder can be deactivated.

Further, assembly tolerance can be reduced as a valve contact portion is integrally formed with both ends of a connecting shaft for connecting an inner body to an outer body so as to remove a pallet.

Further, operational reliability of a valve can be improved as a fixing pin is provided so as to limit a rotational angle of the connecting shaft and prevent a left/right motion when the connecting shaft is mounted to the outer body.

Further, since the lost motion spring is disposed at a center of the connecting shaft, the length of the connecting shaft can be reduced and the entire size of the variable valve lift apparatus decreases, so the weight and manufacturing cost can be reduced and the dynamic characteristics can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
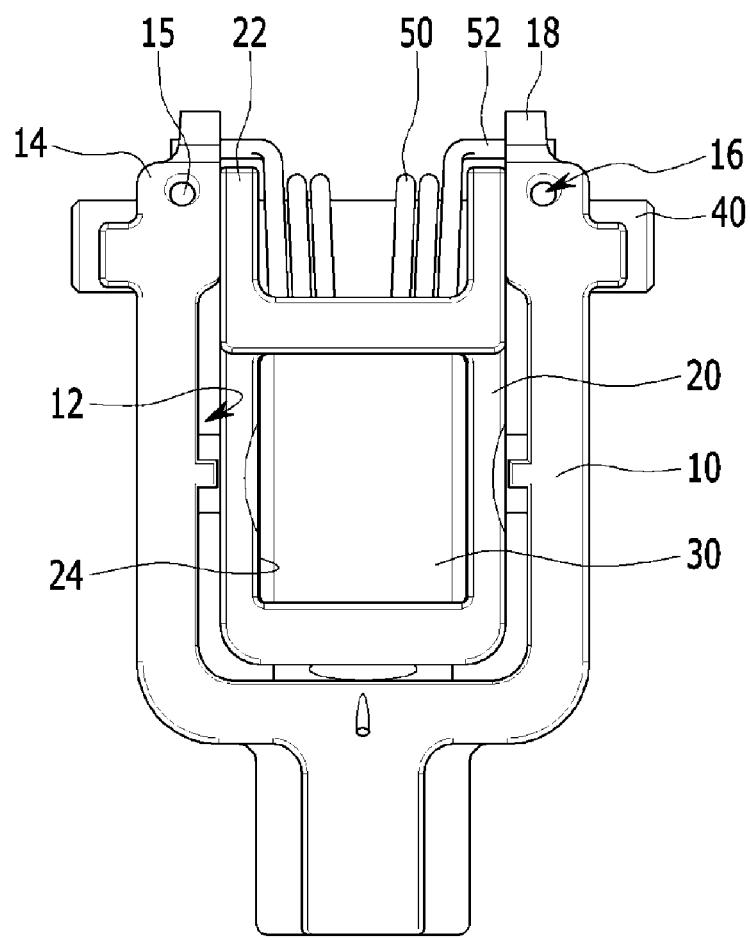
FIG. 1 is a top plan view of a variable valve lift apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

First, since the exemplary embodiment described in the specification and the configurations shown in the drawings are merely the most preferable exemplary embodiment and configurations of the present invention, they do not represent all of the technical ideas of the present invention, and it should be understood that that various equivalents and modified examples, which may replace the exemplary embodiments, are possible when filing the present application.

In order to clearly describe the present invention, parts that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and in order to clearly illustrate several parts and areas, enlarged thicknesses are shown.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

Figure 2:
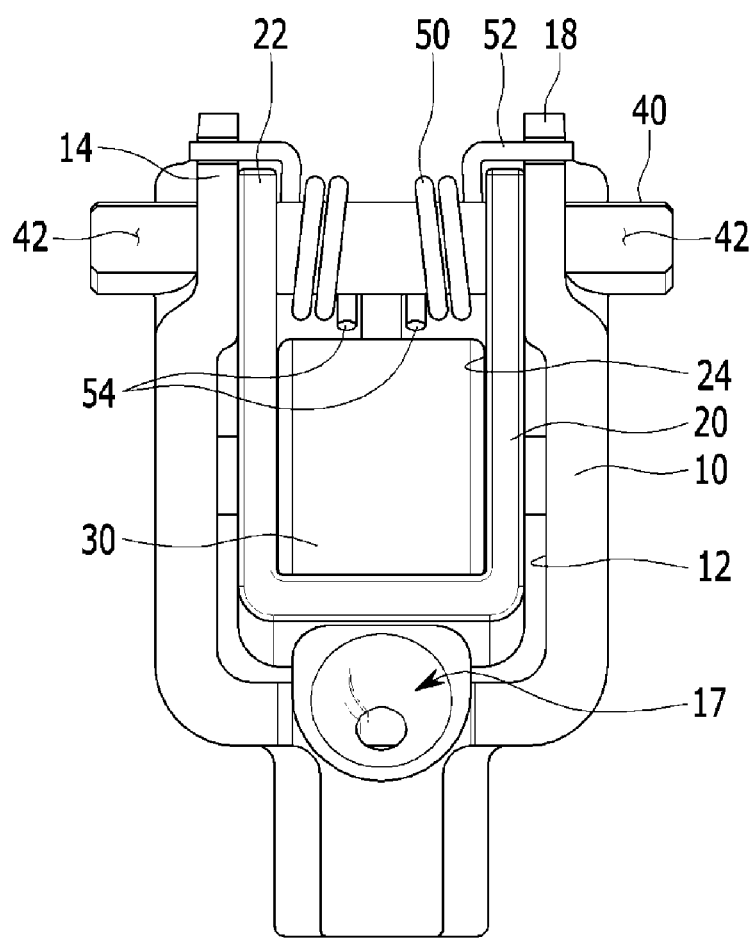
FIG. 2 is a rear view of the variable valve lift apparatus according to an exemplary embodiment of the present invention.
Figure 3:
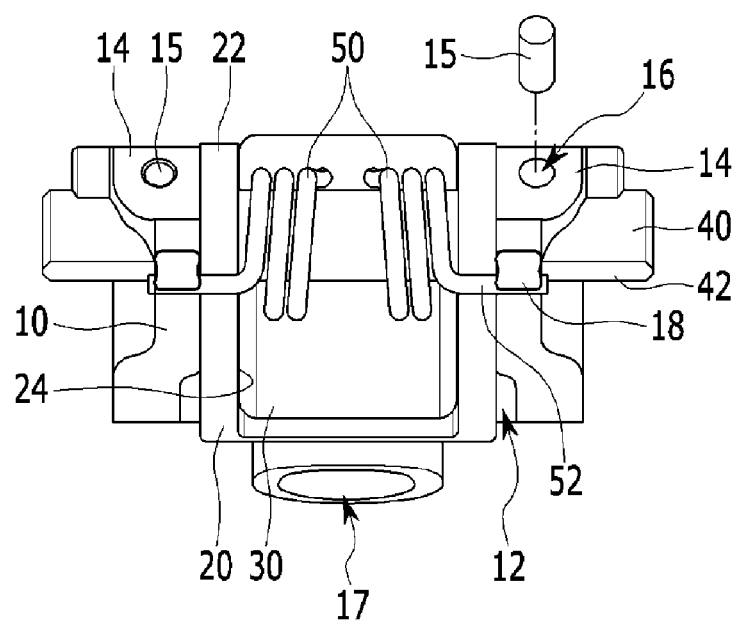
FIG. 3 is a front view of the variable valve lift apparatus according to an exemplary embodiment of the present invention.
Figure 4:
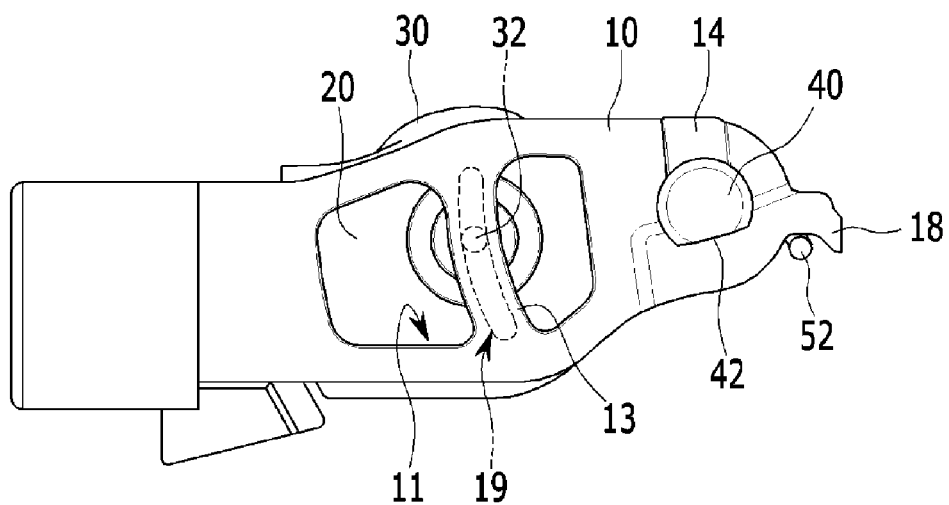
FIG. 4 is a side view of the variable valve lift apparatus according to an exemplary embodiment of the present invention.
Figure 5:
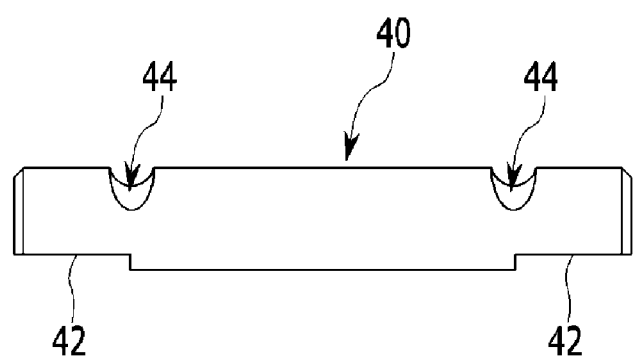
FIG. 5 is a front view of a connecting shaft that is used for the variable valve lift apparatus according to an exemplary embodiment of the present invention.
Figure 6:
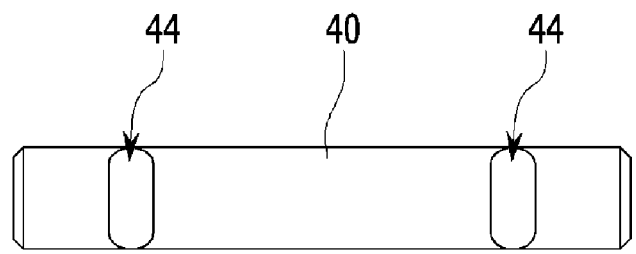
FIG. 6 is a top plan view of the connecting shaft that is used for the variable valve lift apparatus according to an exemplary embodiment of the present invention.
Figure 7:
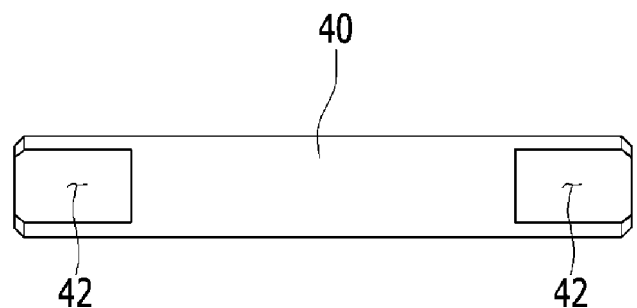
FIG. 7 is a rear view of the connecting shaft that is used for the variable valve lift apparatus according to an exemplary embodiment of the present invention.

FIG. 1 and FIG. 2 are a top plan view and a rear view of a variable valve lift apparatus according to an exemplary embodiment of the present invention, FIG. 3 and FIG. 4 are a front view and a side view of the variable valve lift apparatus according to an exemplary embodiment of the present invention, FIG. 5 and FIG. 6 are a front view and a top plan view of a connecting shaft that is used for the variable valve lift apparatus according to an exemplary embodiment of the present invention, and FIG. 7 is a rear view of the connecting shaft that is used for the variable valve lift apparatus according to an exemplary embodiment of the present invention.

As shown in FIG. 1 to FIG. 4, a variable valve lifting apparatus according to an exemplary embodiment of the present invention includes an outer body 10, an inner body 20, a cam contact portion 30, a connecting shaft 40, and a lost motion spring 50.

The outer body 10 is adapted to make a lever motion by selectively receiving torque of a camshaft, and is operated to open/close a valve. In addition, a plurality of cams are formed or disposed at the camshaft so as to transform rotational motion of the camshaft to lever motion of the outer body 10.

Herein, the valve is an intake valve or an exhaust valve of an engine. A first space 12 that the outer body 10 penetrates in a vertical direction is formed inside of the outer body 10.

That is, the outer body 10 has a set length so as to make a lever motion, and has a set width and a set thickness so as to form the first space 12 of the outer body 10.

The valve is connected to one end of the outer body 10 through the connecting shaft 40, and a rotation axis of the lever motion is disposed at the other end thereof. The first space 12 of the outer body 10 is opened toward one end of the outer body 10, so an entire shape of the outer body 10 may be formed in a "U" shape.

In the following description, one ends and other ends of the components disposed on or coupled to the outer body 10 mean portions in the same directions as the one end and the other end of the outer body 10.

A pinhole 16 may be respectively formed at both ends of the opened one end such that a fixing pin 15 is inserted therein so as to prevent motion in an axial direction of the connecting shaft 40.

The inner body 20 is disposed in the first space 12 of the outer body 10. In addition, one end of the inner body 20 is rotatably connected with the one end of the outer body 10.

The inner body 20 is adapted to make a lever motion by receiving torque of the camshaft, and is operated to selectively open/close a valve. A second space 24 that the inner body 20 penetrates in a vertical direction is formed inside of the inner body 20. That is, the inner body 20 has a set length so as to make a lever motion, and has a set width and a set thickness so as to form the second space 24 of the inner body.

The cam contact portion 30 is disposed in the second space 24. In addition, the cam contact portion 30 is rotatably connected with the inner body 20. Further, the cam contact portion 30 is connected with the cam so as to transform rotational motion of the camshaft to lever motion of the outer body 10 or the inner body 20.

The cam contact portion 30 may be configured as a roller or a pad. When the cam contact portion 30 is the roller, the cam contact portion 30 may be rolling-contacting the cam. When the cam contact portion 30 is the pad, the cam contact portion 30 is sliding-contacting the cam.

The connecting shaft 40 is provided so as to rotatably connect the one end of the outer body 10 and the one end of the inner body 20. That is, the inner body 20 may make a relative rotation with the outer body 10 around the connecting shaft 40. Herein, the one end of the outer body 10 being connected with the inner body 20 by the connecting shaft 40 will be called "outer connecting portion 14", and the one end of the inner body 20 being connected with the outer body 10 by the connecting shaft 40 will be called "inner connecting portion 22".

Both ends of the connecting shaft 40, as shown in FIG. 5 to FIG. 7, are protruded to both sides in the width direction of the outer body 10, and a valve contact portion 42 which contacts a valve may be formed at the both ends.

The valve contact portion 42 contacts the valve or a valve opening/closing unit for opening/closing the valve so as to push the valve by the lever motion of the outer body 10.

The valve contact portion 42 is respectively protruded from both sides of the outer connecting portion 14 so as to push two valves. In addition, the valve contact portion 42 may be formed by a horizontal surface at both sides of the connecting shaft 40.

Here, a fixing groove 44 corresponding to the pinhole 16 may be respectively formed at both sides opposite to the valve contact portion 42 of the connecting shaft 40.

The fixing groove 44 is formed at both ends in a length direction of the connecting shaft 40 apart from each other, and a cross-section thereof may be respectively formed in a half-circle shape.

The fixing groove 44 is locked by the fixing pin 15, which is inserted into the pinhole 16, so as to limit the motion of the connecting shaft 40 along an axial direction such that the connecting shaft 40 does not escape from the outer body 10 and to limit a rotational angle of the connecting shaft 40 such that the connecting shaft 40 is fixed in the initial position.

Meanwhile, a receiving groove 17, where the hydraulic lash adjuster is seated, is formed at the other end of the outer body 10.

That is, the variable valve lift apparatus according to an exemplary embodiment of the present invention is a three-point supported variable valve lift apparatus which is supported by the two valves and the one hydraulic lash adjuster. Here, the hydraulic lash adjuster, a device that supplies hydraulic pressure to operate a variable valve lift apparatus and allows a valve lifter to move in close contact with a cam, is well known to those skilled in the art, so the detailed description is not provided.

When the inner body 20 is fixed to the outer body 10, the inner body 20 and the outer body 10 make a lever motion together around the rotation axis of the outer body 10 by rotation of the cam contacting the cam contact portion 30.

In addition, only the inner body 20 makes a lever motion around the connecting shaft 40 by rotation of the cam contacting the cam contact portion 30 when the inner body 20 fixed to the outer body 10 is released.

Selectively fixing and unfixing the inner body to the outer body 10, for example, with a latching pin, are well known to those skilled in the art, so the detailed description is not provided.

Meanwhile, an opening hole 11, as shown in FIG. 4, is respectively formed at both sides of the outer body 10 in a width direction. A rib 13 corresponding to a shaft 32, which is rotatably supported by the cam contact portion 30, may be formed on the opening hole 11.

In addition, the rib 13 is formed so as to connect an upper portion with a lower portion of the opening hole 11 along the lever motion direction of the inner body 20. The rib 13 may be adapted to form a guide groove 19 at an interior surface thereof where the shaft 32 is inserted.

The rib 13 may reinforce structural rigidity of the outer body 10. In addition, the rib 13 may prevent motion in an axial direction of the shaft 32, and may simultaneously stably guide the lever motion of the inner body 20 by the guide groove 19.

In case the inner body 20 is released from the outer body 10, the lost motion spring 50 functions to return the inner body 20 by a relative rotation with the outer body 10 by a lever motion. In addition, the lost motion spring 50 is disposed to be coiled around the connecting shaft 40.

The lost motion spring 50 forms an outer fixing portion 52 which is fixed to the outer body 10 and an inner fixing portion 54 which is fixed to the inner body 20. In addition, the outer fixing portion 52 may extend along a width direction of the outer body 10 to not be interfered with by the inner body 20, and may be fixed to the outer body 10.

Here, the outer body 10 may integrally form a supporting end 18 to correspond to the one end of the lost motion spring 50.

That is, the outer fixing portion 52 of the lost motion spring 50 may be fixed to the supporting end 18 of the outer body 10.

As the lost motion springs 50 is disposed to be coiled around the connecting shaft 40, the lost motion springs 50 is easily fixed to the inner body 20, and additional constituent elements for connecting the lost motion spring 50 with the outer body 10 or the inner bodies 20 are not required.

For instance, when the lost motion spring 50 is disposed to be coiled around the rotation axis of the outer body 10 and one part of the lost motion spring 50 is connected with the inner body 20 through the shaft 32 of the cam contact portion 30, the length of the shaft 32 may become long and additional constituent elements for coiling the lost motion spring 50 around the rotation axis of the outer body 10 lever motion may be required.

Therefore, the present invention provides a variable valve lift apparatus having further advantages of reducing assemble tolerance as a valve contact portion 42 is integrally formed with both ends of a connecting shaft 40 for connecting the inner body 20 to the outer body 10 so as to remove a pallet.

As described above, according to an exemplary embodiment of the present invention, two valve lifts are changed by the cam contact portion 30 moving in contact with one cam, such that a loss of power due to friction on the cam can be minimized.

Further, since only the inner body 10 pivots with the cam contact portion being in contact with the cam, a cylinder can be deactivated.

In addition, assembly tolerance can be reduced as a valve contact portion 42 is integrally formed with both ends of a connecting shaft 40 for connecting the inner body 10 to the outer body 10 so as to remove a pallet.

Operational reliability of a valve can also be improved as a fixing pin 15 is provided so as to limit rotational angle of the connecting shaft 40 and prevent a left/right motion when the connecting shaft 40 is mounted to the outer body.

Finally, since the lost motion spring 50 is disposed at the center of the connecting shaft 40, the length of the connecting shaft 40 can be reduced and the entire size of the variable valve lift apparatus decreases, so the weight and manufacturing cost can be reduced and the dynamic characteristics can be improved.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable valve lift apparatus that changes a lift of a valve in an engine, comprising:
   an outer body selectively making a lever motion according to rotation of a cam and forming a first space;
   an inner body disposed in the first space, adapted such that a first end thereof is rotatably connected with a first end of the outer body, and forming a second space;
   a cam contact portion disposed in the second space, rotatably connected to the inner body, and contacting the cam so that the inner body makes a lever motion according to rotation of the cam;
   a connecting shaft disposed to penetrate the first end of the outer body and the first end of the inner body and connect the outer body with the inner body; and
   a lost motion spring adapted such that a first end thereof is fixed to the outer body and a second end thereof is fixed to the inner body,
   wherein the inner body is selectively fixed to the outer body to make a lever motion together with the outer body around a rotation axis of the outer body lever motion or is selectively released from fixing with the outer body to make a lever motion around the connecting shaft,
   wherein both ends of the connecting shaft protrude to both sides in the width direction of the outer body and a valve contact portion which contacts a valve is formed at the both ends,
   wherein the outer body is formed in a "U" shape as the first space is opened toward the first end of the outer body, and a pinhole is respectively formed at both ends of the opened first end such a fixing pin is inserted therein to prevent motion in an axial direction of the connecting shaft, and
   wherein a fixing groove corresponding to the pinhole is respectively formed at both sides opposite to the valve contact portion of the connecting shaft.

2. The apparatus of claim 1, wherein the fixing groove is formed at both ends in a length direction of the connecting shaft apart from each other, and a cross-section thereof is respectively formed in a half-circle shape.

3. The apparatus of claim 1, wherein the valve contact portion is formed by a horizontal surface at both sides of the connecting shaft.

4. The apparatus of claim 1, wherein an opening hole is respectively formed at both sides of the outer body in a width direction and a rib corresponding to a shaft, which is rotatably supported by the cam contact portion, is formed on the opening hole.

5. The apparatus of claim 4, wherein the rib is formed to connect an upper portion with a lower portion of the opening hole along the lever motion direction of the inner body, and is configured to form a guide groove at an interior surface thereof where the shaft is inserted.

6. The apparatus of claim 1, wherein the lost motion spring is provided to return the inner body which is relatively rotated with the outer body around the connecting shaft.

7. The apparatus of claim 1, wherein the first end of the lost motion spring is extended without interference with the inner body to be fixed to the first end of the outer body.

8. The apparatus of claim 7, wherein the outer body integrally forms a supporting end to correspond to the first end of the lost motion spring.

\* \* \* \* \*